June 2, 1942. C. J. SCHIPPLOCK 2,285,364
GALVANIZING KETTLE
Filed May 19, 1941
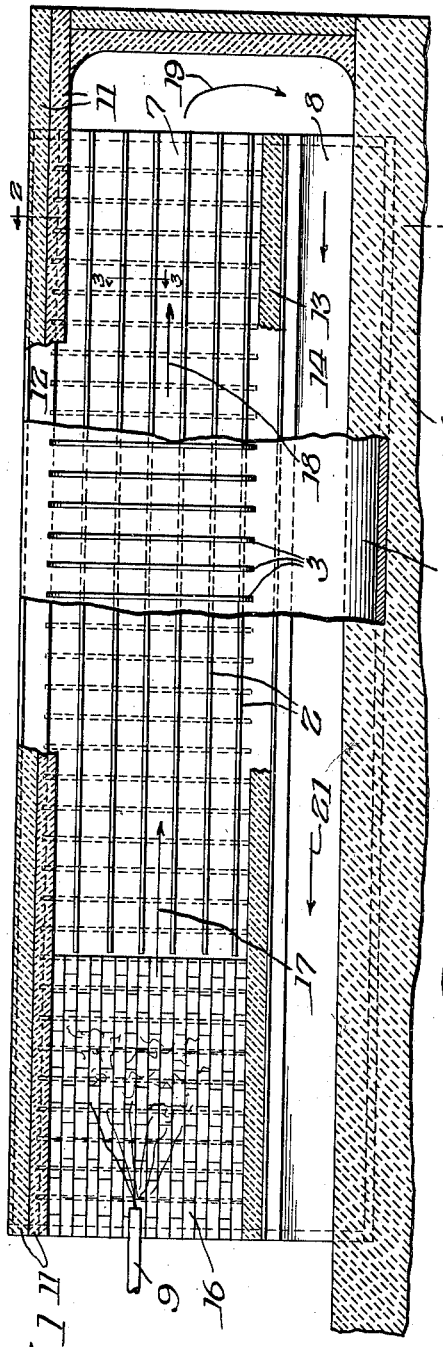
Inventor:
Charles J. Schipplock
By: Joseph O. Lange Atty.

Patented June 2, 1942

2,285,364

UNITED STATES PATENT OFFICE 2,285,364

GALVANIZING KETTLE

Charles J. Schipplock, Chicago, Ill., assignor to Crane Co., Chicago, Ill., a corporation of Illinois Application May 19, 1941, Serial No. 394,093

2 Claims. (Cl. 263—11)

This invention relates to an improved smelting device and particularly to improvements in this type of apparatus for preparing any molten material for a hot-dip coating process as an example of which is galvanizing with which process I will describe one application of my invention.

In brief, galvanizing is a corrosion-proofing process generally applied to ferrous articles and consists of dipping the articles into a vat or kettle of molten zinc and withdrawing them covered by a rust-resistant coating of zinc. The process is highly successful because of a slight solubility of zinc in iron compounds thereby promoting actual welding or commingling of the zinc and iron at the interface between the two metals. This slight solubility works a disadvantage, however, in that iron or steel linings of the ordinary melting kettle are also dissolved into the zinc resulting in deterioration of the kettle and formation of "dross" which is pure zinc contaminated with iron. A galvanized coating contaminated with dross is undesirable from many standpoints, for instance the bond between the base metal and coating will not be tight. Further, the coating will be brittle and have a strong tendency to peel when the base metal is distorted. This dissolving action on the kettle walls, with its consequent deterioration in the quality of the galvanized coating, is increased as the temperature of the wall is increased and is particularly aggravated in any case of actual flame impingement or highly localized heat, and many attempts have been made to construct galvanizing devices in which the inlet temperature could be lowered and thereby moderate the heat input.

The conventional melting kettle employed in galvanizing contains little zinc in proportion to the exposed upper heat radiating surface of the molten metal and is made with smooth walled sides of insufficient area so that a considerable quantity of heat must necessarily be passed through the kettle side wall areas in order to maintain the zinc in the fluid state and to allow for the heat losses occurring due to radiation and absorption by the coated articles. In the latter connection it is interesting to note that in many installations it has previously been necessary to maintain the fire chamber as high as 1800 degrees Fahrenheit in order to maintain a zinc temperature of 850 degrees Fahrenheit. The reason for this requirement, as explained, is that the kettle itself contains so little zinc and offers such relatively small surface area to which the heat may be applied that the transfer of heat from the fire chamber to the outgoing work is extremely rapid. This objectionable condition results in a zinc flow which holds great quantities of dross in suspension, thereby aiding in the formation of more dross and producing a dross-contaminated galvanized coating.

Attempts to remedy this situation by constructing kettles with larger side wall areas have met with significant success. For example, it has been found that a kettle with walls 14" high required such a high temperature differential that 32 per cent of all new zinc added had to be dug out of the bottom as dross, and every six months it was necessary to install a new pan. On the other hand, another kettle having side walls 42" high had a dross loss of only 3 per cent and the kettle could be used for several years without replacing, when operating on the same production tonnage as the shorter kettle. Furthermore, in connection with the larger kettle it was found that the outside of the kettle walls need not exceed 1200 degrees Fahrenheit in order to maintain the zinc at 850 degrees Fahrenheit in the molten state.

By thus increasing the heat transfer area of galvanizing kettle side walls, the loss of zinc in the form of dross has been very favorably minimized but this has required a considerable increase in the height of these walls and the volume occupied by the kettle, and generally the changeover from a smaller kettle to a larger, bulkier kettle has entailed a great deal of expense and a major interruption of production schedules.

Accordingly a principal object of my invention lies in the provision of means for increasing the heat transfer surface of galvanizing kettles and the like without appreciably increasing the volume occupied by them. Among the advantages which will readily occur to one skilled in the art are: greater production efficiency due to increased utilization of a given space; lowered first and replacement costs; and increased facility in the changeover or conversion of existing equipment.

Specifically, the essence of my invention lies in the provision of fins or ribs attached to the side walls of galvanizing kettles or the like in order to increase the efficiency of the heat transfer therethrough. Apparently no one previously has appreciated that finned structures could be used successfully in connection with molten metal for, to my knowledge, no one has ever used such a structure but, on the contrary, as previously alluded to, heat transfer from the firebox to the melted zinc has been increased by raising the height of the side walls thereby producing very bulky and expensive structures.

Other objects and advantages will become more readily apparent upon proceeding with the following detailed description of my invention in conenction with the drawing, in which—

Fig. 1 is a side elevation view of a galvanizing kettle with the outer brick work removed, employing my invention.

Fig. 2 is a fragmentary sectional end elevation view taken on the line 2—2 of Fig. 1.

Fig. 3 is an enlarged fragmentary sectional view of Fig. 1 taken on the line 3—3 of Fig. 1.

Like numerals refer to like parts thorughout the drawing.

Referring now in detail to the drawing, the galvanizing kettle generally designated 1 is shown in side elevation in Fig. 1 with the usual outer brick work built around it removed. The kettle has the outer horizontally extending fins 2 and the inner vertically extending fins 3 (indicated in broken lines in Fig. 1). Of course I do not desire to be limited to these particular forms of fins or ribs as they may obviously take many other configurations. The outside fins 2 for instance may be vertical and the inside fins 3 may be horizontal. Also they may or may not cover the entire area of the walls as may be deemed necessary depending upon the type of kettle to which the principle is applied. Alternately, too, they may be of broken or discontinuous form, or may consist merely of a roughened, or wavy, or discontinuous surface and may be on one or both surfaces of the kettle side walls. These fins may be held in place in any suitable manner, as for instance by the welding metal 4 as shown in Fig. 3, and alternately, they may be formed integral with the kettle in the first instance. In Fig. 2 the floor 6 of the building containing the kettle is shown as the main supporting means; the inlet flue passage 7 and the outlet flue passage 8 provide for the circulation of hot gases generated by the burner member 9 (shown in Fig. 1). The upper wall 11 of the inlet flue passage 7 is composed of a double layer of fire brick or other heat resistant insulating material and is supported by the angle iron 12 which is attached to the kettle wall 1 in any suitable manner. The lower wall 13 of the flue passage 7 is formed of a similar but single layer of heat resistant material supported by the angle iron 14 attached to the kettle. An overlay of fire bricks 16 or other insulating material is employed immediately adjacent the nozzle 9 to prevent the direct impingement of the flame on the bare metal of the kettle 1, and consequently serves to avoid objectionable localized overheating. As a result, the generation of dross is minimized.

In operation, the hot gases generated by the burner 9 flow to the right across the kettle parallel to the fins 2. For clarity, the direction of flow is indicated by the arrows designated 17, 18, 19 and 21. At 21 the gases may be exhausted or recirculated in whole or in part, as desired, in which case a suitable opening between the chambers 7 and 8 would be provided in the neighborhood of the insulating wall 16; the successful operation of my invention does not depend on the method of heat circulation as herein outlined. Further, the method of firing or kind of kettle is of no particular significance and the application of fins is not limited to any one method or kind but can be applied to recirculating, radiant, or multi-burner types, and to horizontal or vertical flue gas travel as may be found necessary or desirable to promote transfer of heat from the combustion chamber to the molten bath. The fins 2 on the outside of the kettle assist the absorption of heat and the fins 3 assist in the transfer of heat to the molten metal inside the kettle to such an extent that in one installation I have found that the necessary temperature of gases entering the flue passage 7 may be reduced as much as 200 to 300 degrees Fahrenheit simply by the addition of fins such as I have described. I have further found that in actual practice commercially, a 25 ton capacity kettle equipped with fins in the manner which I have outlined may operate continuously with flue temperatures of 1200 to 1300 degrees and maintain the zinc in the fluid condition at 850 degrees Fahrenheit or more.

By way of summary I have discovered a very simple, practical and inexpensive means of increasing the efficiency of high temperature melting units of all kinds. A list of the beneficial results achieved by my invention would include: (1) more effective heat transfer; (2) lower fuel consumption; (3) lower firebox temperature; (4) lower radiation losses; (5) lower dross generation; and (6) longer kettle life.

While my invention has been described and illustrated in connection with a galvanizing kettle it should be obvious that ready application may be made of it in many related arts. Accordingly I wish to be limited only within the spirit and scope of my invention as defined by the appended claims.

I claim:

1. A galvanizing kettle or the like comprising a vessel suitable for containing molten metal, independent means for directing heated fluid onto the outer surface of said vessel, the said vessel having walls formed with substantially projecting surfaces both inside and outside thereof, the said projecting surfaces being arranged so as to break up the flow of heated fluid and molten metal inside and outside respectively of the said vessel, the said projecting surfaces on the inside of said vessel running substantially horizontally and the said projecting surfaces on the outside of the said vessel running substantially vertically, whereby a maximum amount of heat is extracted from the said fluid and delivered through the said walls to the said molten metal.

2. A galvanizing kettle or the like comprising a vessel suitable for containing molten metal, independent means for directing heated fluid onto the outer surface of said vessel, the said vessel having walls formed with fins on its inner and outer surfaces, the said fins being adapted to break up the flow of heated fluid and molten metal inside and outside respectively of the said vessel, the said fins on the inner surface of the said vessel being positioned substantially vertically thereof and the said fins on the outer surface being placed substantially horizontally thereof, whereby the heated fluid is circulated parallel to the horizontal outer fins and aids in absorption of heat and whereby the inner vertical fins assist in the transfer of heat to the molten metal inside the vessel.

CHARLES J. SCHIPPLOCK.